United States Patent
Chen et al.

(10) Patent No.: US 10,020,853 B2
(45) Date of Patent: Jul. 10, 2018

(54) METHOD AND SYSTEM FOR PROCESSING DOWNLINK PILOT SIGNAL

(71) Applicant: ZTE CORPORATION, Shenzhen (CN)

(72) Inventors: Yijian Chen, Shenzhen (CN); Zhaohua Lu, Shenzhen (CN); Jing Zhao, Shenzhen (CN); Yuxin Wang, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 0 days.

(21) Appl. No.: 15/324,847

(22) PCT Filed: Apr. 15, 2015

(86) PCT No.: PCT/CN2015/076645
§ 371 (c)(1),
(2) Date: Jun. 7, 2017

(87) PCT Pub. No.: WO2015/184927
PCT Pub. Date: Dec. 10, 2015

(65) Prior Publication Data
US 2017/0279504 A1 Sep. 28, 2017

(30) Foreign Application Priority Data
Jul. 9, 2014 (CN) .......................... 2014 1 0325161

(51) Int. Cl.
*H04K 1/10* (2006.01)
*H04L 27/28* (2006.01)
(Continued)

(52) U.S. Cl.
CPC ......... *H04B 7/0421* (2013.01); *H04B 7/0452* (2013.01); *H04B 7/0456* (2013.01); *H04B 7/0626* (2013.01)

(58) Field of Classification Search
CPC .. H04B 7/0421; H04B 7/0626; H04B 7/0456; H04B 7/0452; H04B 7/0413; H04B 7/0434; H04B 7/0617
(Continued)

(56) References Cited

U.S. PATENT DOCUMENTS

2009/0046800 A1* 2/2009 Xu ....................... H04B 7/0617
375/267
2009/0067513 A1* 3/2009 Kim ..................... H04B 7/0413
375/260
(Continued)

FOREIGN PATENT DOCUMENTS

| CN | 101444054 | 5/2009 |
|---|---|---|
| CN | 103220068 | 7/2013 |

OTHER PUBLICATIONS

International Search Report for PCT/CN2015/076645, English Translation attached to original, Both completed by the Chinese Patent Office dated Jul. 10, 2015, All together 5 Pages.

*Primary Examiner* — Phuong Phu
(74) *Attorney, Agent, or Firm* — Plumsea Law Group, LLC (57) ABSTRACT

A method and system for processing a downlink pilot signal is disclosed. Herein, the method includes: a receiving end detecting downlink measurement pilot ports to obtain a received signal corresponding to each downlink measurement pilot port on each receiving antenna; performing screening on the downlink measurement pilot ports according to the received signals; calculating a receiving weight vector of each downlink measurement pilot port, and using an uplink precoding weight vector, calculated and obtained by combining the receiving weight vector with uplink and downlink operating frequencies, for data precoding; or, using N uplink precoding weight vectors, calculated and obtained by combining the receiving weight vector with
(Continued)

uplink and downlink operating frequencies, for uplink pilot precoding, where N is the number of uplink precoding pilots transmitted, and N is an integer which is greater than or equal to 1. The above technical solution can effectively reduce pilot overhead in communication systems.

18 Claims, 2 Drawing Sheets

(51) Int. Cl.
    *H04B 7/0417*     (2017.01)
    *H04B 7/06*     (2006.01)
    *H04B 7/0456*     (2017.01)
    *H04B 7/0452*     (2017.01)

(58) Field of Classification Search
    USPC ............... 375/260, 346, 267, 299, 347, 349
    See application file for complete search history.

(56) References Cited

U.S. PATENT DOCUMENTS

| | | | |
|---|---|---|---|
| 2012/0099469 A1* | 4/2012 | Luo | H04B 7/0434 370/252 |
| 2013/0308727 A1* | 11/2013 | Guo | H04B 7/0434 375/299 |
| 2014/0112168 A1 | 4/2014 | Chen et al. | |
| 2015/0326291 A1* | 11/2015 | Wong | H04L 7/0012 375/267 |
| 2017/0048009 A1* | 2/2017 | Sarkar | E05D 13/04 |
| 2017/0150482 A1* | 5/2017 | Chen | H04W 72/042 |

\* cited by examiner

METHOD AND SYSTEM FOR PROCESSING DOWNLINK PILOT SIGNAL

CROSS-REFERENCE TO RELATED APPLICATION

This application is the U.S. national phase of PCT Application No. PCT/CN2015/076645 filed Apr. 15, 2015, which claims priority to Chinese Application No. 201410325161.8 filed Jul. 9, 2014, the disclosures of which are incorporated in their entirety by reference herein.

TECHNICAL FIELD

The present document relates to the technical field of communications, in particular, to a method and system for processing a downlink pilot signal.

BACKGROUND

In a wireless communication system, a transmitting end and a receiving end obtain a higher rate by using a plurality of antennas in a spatial multiplexing mode. Compared with a common spatial multiplexing mode, an enhanced technique is that the receiving end feeds back channel state information (CSI) to the transmitting end and the transmitting end uses some transmission precoding techniques according to the obtained channel state information to greatly improve transmission performance. For Single-User Multi-input Multi-output (MIMO), channel characteristic vector information is directly used for precoding; and for Multi-User MIMO, more accurate channel state information is needed. In some techniques such as in LTE of 4G, 802.16m standard specification, feedback of channel state information mainly utilizes a simpler single-codebook feedback way, while the performance of the transmission precoding technique of MIMO is more dependent on the accuracy of codebook feedback. Here, the basic principle of the channel state information quantization feedback based on a codebook is simply set forth below: supposing that limited feedback channel capacity is B bps/Hz, the number of available code words is $N=2^B$. A characteristic vector space of a channel matrix forms a codebook space $\Re=\{F_1, F_2 \ldots \}$, after quantization, the transmitting end and the receiving end both save or generate the codebook (the codebook in the receiving end/transmitting end is the same) in real time. The receiving end obtains a channel matrix H, selects a code word $\hat{F}_i$ which most matches a channel from the codebook space $\Re$ in accordance with a certain criterion, and feeds back a code word sequence number i of the code word to the transmitting end, herein the code word sequence number is called as a Precoding Matrix Indicator (PMI); and the transmitting end finds the corresponding precoding code word $\hat{F}_i$ according to the sequence number i and thus obtains the channel state information, herein $\hat{F}_i$ denotes characteristic vector information of the channel.

With the high-speed development of the wireless communication technology, wireless applications of users are increasingly rich, thereby driving the quick increase of wireless data services. It is predicted that, within the next 10 years, data services increase at a rate of 1.6 to 2 times per year, which would bring a huge challenge to wireless access networks. A multi-antenna technique is a key technique for coping with explosive increase challenge of wireless data services. At present, the multi-antenna technique supported in 4G is a horizontal-dimension beam forming technology which only supports 8 ports at most, and there is a greater potential to further greatly improve system capacity.

Evolution of the multi-antenna technique is performed mainly around several targets as follows: (1) higher beam forming/precoding gains; (2) more space multiplexing layers (MU and SU), and smaller interlayer interference; (3) more overall coverage; and (4) smaller interference between sites. Massive MIMO and 3D MIMO are two main candidate techniques for MIMO evolution in the next generation wireless communication. For a system based on a Massive MIMO technique, it is mainly characterized in that a transmitting end side is configured with a massive antenna array, for example, 100 antennas or even more, and during data transmission, multiple users are multiplexed simultaneously at the same frequency by using the Multi-User Multi-input Multi-output (MU-MIMO) technique. It can be proved that, no matter whether it is a strongly-correlative channel in a line-of-sight environment or a non-correlative channel under a rich scattering environment, a correlation coefficient between channels of any two users is exponentially attenuated with the increase of the number of the antennas. For example, when the transmitting end side is configured with 100 antennas, the correlation coefficient between the channels of any two users is approximately 0, i.e., corresponding channels of multiple users are approximately orthogonal. In another aspect, a massive array can bring very considerable array gains and diversity gains. The main technical feature of 3D MIMO lies in that, beam forming capabilities are very good in both a vertical dimension and a horizontal dimension. Due to the limitation on antenna size, there is little possibility to place more than a hundred of antennas in one dimension. Therefore, in most application scenarios, when the Massive MIMO technology is applied, the 3D MIMO is generally used in a combined manner.

For Massive MIMO, due to the introduction of massive antennas, the traditional method is that each antenna transmits a Channel State Information-Reference Signal (CSI-RS), and a receiving end detects the CSI-RS, obtains a channel matrix corresponding to each transmission resource through channel estimation, obtains an optimal precoding vector of each frequency-domain sub-band on a base band and optimal transmission layer number information of a broadband according to the channel matrix, and then performs a feedback based on the above introduced codebook feedback technique. This method has a greater problem during application in Massive MIMO, which is mainly embodied as follows: pilot overhead can increase with the increase of the transmitting antenna number and is very huge when the number of antennas is large. In addition, since the codebook used during feedback needs to contain a great many code words, it is very difficult to select the code words, and a very great complexity is caused to the receiving end and there is almost no possibility to implement, or a huge cost needs to be spent. Moreover, the overhead for codebook feedback is so great that the feedback link overhead is huge. Therefore, generally a better method for Massive MIMO is to use a beam selection technique or a beam training technique to obtain an optimum beam forming precoding weight, herein the beam forming precoding weight can be used to perform weighting and forming on radio frequency signals in time-domain to form beams, such that energy is more concentrated.

Some basic principles of beam forming and beam selection techniques are described below. A transmitting end sends a plurality of pilot beams that are subjected to beam forming, herein, generally transmitting beam forming can also be referred to as precoding, or transmitting weighting processing, such pilot beams are formed after weighting and combining transmission signals on a plurality of antenna and correspond to a plurality of transmitting antenna. The binding relationship between a sending resource position of a plurality of Pilot Beams and the number of pilots (Beam ID) can be learned from signaling configurations or agreements made in advance with receiving and transmitting ends. The receiving end detects transmitting positions of a plurality of Pilot Beams, selects one or more stronger beams, and informs the transmitting end through uplink feedback. The transmitting end performs beam forming on data transmission based on a beam forming weight on the pilot in accordance with feedback information of the receiving end.

In order to save pilot overhead and improve feedback efficiency, beam selection can be further extended to a secondary beam selection. Pilot Beam can be further divided into Sector Beam (a first stage beam pilot, a coarse beam) and Finer Beam (a second stage beam pilot, a narrow beam). The transmitting end first transmits Sector Beam and the receiving end selects the best Sector Beam, then the transmitting end transmits Finer Beam included in the Sector Beam, and the receiving end feeds back information of the best Finer Beam. The transmitting end performs beam forming based on the information fed back by the receiving end. In addition to the feature in which the transmitting end system can send beam pilots to perform selection and training of downlink forming weights, the receiving end can also transmit beam pilots to perform selection and training of uplink forming weights. A solution similar to the downlink beam selection technique can be used to acquire uplink channel information.

In an ideal TDD system, when the uplink and downlink reciprocity is available, generally, an uplink optimum precoding weight can be obtained by transmitting downlink pilots through reciprocity, and a downlink optimum precoding weight can be obtained by transmitting uplink pilots through reciprocity. However, for a FDD system or a TDD system with poor reciprocity, in the related art, if large-scale antennas are employed for both uplink and downlink, the above-described beam selection technique is required to be employed for both receiving and transmitting ends for performing transmission of a plurality of beam pilots and then performing beam selection. For the downlink, these beam pilots can be shared to some extent because the transmitting end services a plurality of user terminal, although the number of beams has a certain effect on overhead, the influence is small. However, for the user terminal UE, due to the large number and the fact that each UE transmits a plurality of beams for selection by a base station, significant pilot overhead of uplink will be thus caused, thereby severely influencing the system's effective resource utilization.

Therefore, how to reduce uplink pilot overhead in FDD system or in other communication systems with poor reciprocity becomes an important subject.

SUMMARY

The embodiments of the present document provide a method and system for processing a downlink pilot signal, in order to solve the technical problem of how to effectively reduce pilot overhead in communication systems.

In order to solve the above technical problem, an embodiment of the present document provides a method for processing a downlink pilot signal, and the method includes:

detecting, by a receiving end, downlink measurement pilot ports to obtain a received signal corresponding to each downlink measurement pilot port on each receiving antenna;

performing screening on the downlink measurement pilot ports according to the received signals;

calculating a receiving weight vector of each downlink measurement pilot port, and using an uplink precoding weight vector, obtained by combining the receiving weight vector with uplink and downlink operating frequencies, for data precoding; or, using N uplink precoding weight vectors, obtained by combining the optimum receiving weight vector with uplink and downlink operating frequencies, for uplink pilot precoding, where N is the number of uplink precoding pilots transmitted, and N is an integer which is greater than or equal to 1.

In an exemplary embodiment, using an uplink precoding weight vector, calculated and obtained by combining the receiving weight vector with uplink and downlink operating frequencies, for data precoding, or when N=1, using one uplink precoding weight vector, calculated and obtained by combining the receiving weight vector with uplink and downlink operating frequencies, for uplink pilot precoding includes:

obtaining an uplink transmitting weight vector of each downlink measurement pilot port according to the uplink and downlink frequencies and the receiving weight vector of the corresponding downlink measurement pilot port;

using the one uplink precoding weight vector, obtained by weighting and combining uplink transmitting weight vectors of various effective downlink measurement pilot ports, for data precoding or uplink pilot precoding.

In an exemplary embodiment, each downlink measurement pilot port is formed by the same set of antennas of a transmitting end using different precoding weights for transmission.

In an exemplary embodiment, performing screening on the downlink measurement pilot ports according to the received signals includes:

performing screening on the downlink measurement pilot ports according to the magnitude of power or signal-to-noise ratios of the received signals.

In an exemplary embodiment, using an uplink precoding weight vector, calculated and obtained by combining the receiving weight vector with uplink and downlink operating frequencies, for data precoding, or using N uplink precoding weight vectors, calculated and obtained by combining the receiving weight vector with uplink and downlink operating frequencies, for uplink pilot precoding includes:

obtaining an uplink transmitting weight vector of the downlink measurement pilot port according to the receiving weight vector of the corresponding downlink measurement pilot port, and multiplying a ratio of an uplink operating frequency to a downlink operating frequency with a phase of the uplink transmitting weight vector.

In an exemplary embodiment, using N uplink precoding weight vectors, calculated and obtained by combining the receiving weight vector with uplink and downlink operating frequencies, for uplink pilot precoding includes:

after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and the number of the downlink measurement pilot ports;

or, after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and at least one of the following factors;

the factors include: (a) a precoding weight or a beam width of a downlink beam pilot; (b) the number of downlink transmitting antennas; (c) the number of uplink transmitting antennas; and (d) signal-to-noise ratios of the received signals.

In order to solve the above-described technical problem, an embodiment of the present document provides a system for processing a downlink pilot signal that is applied to a receiving end, the system including:

a receiving module, arranged to detect downlink measurement pilot ports to obtain a received signal corresponding to each downlink measurement pilot port on each receiving antenna;

a port screening module, arranged to perform screening on the downlink measurement pilot ports according to the received signals;

a calculating module, arranged to calculate a receiving weight vector of each downlink measurement pilot port, and set an uplink precoding weight vector, calculated and obtained by combining the receiving weight vector with uplink and downlink operating frequencies, for data precoding; or, set N uplink precoding weight vectors, calculated and obtained by combining the optimum receiving weight vector with uplink and downlink operating frequencies, for uplink pilot precoding, where N is the number of uplink precoding pilots transmitted, and N is an integer which is greater than or equal to 1.

In an exemplary embodiment, the calculating module is arranged to set an uplink precoding weight vector, calculated and obtained by combining the receiving weight vector with uplink and downlink operating frequencies, for data precoding, or when N=1, set one uplink precoding weight vector, calculated and obtained by combining the receiving weight vector with uplink and downlink operating frequencies, for uplink pilot precoding in the following manner:

obtaining an uplink transmitting weight vector of each downlink measurement pilot port according to the uplink and downlink frequencies and the receiving weight vector of the corresponding downlink measurement pilot port;

setting the one uplink precoding weight vector, obtained by weighting and combining the uplink transmitting weight vectors of various downlink measurement pilot ports, for data precoding or uplink pilot precoding.

In an exemplary embodiment, each downlink measurement pilot port is formed by the same set of antennas of a transmitting end using different precoding weights for transmission.

In an exemplary embodiment, the port screening module is arranged to perform effective screening on the downlink measurement pilot ports according to the received signals in the following manner:

performing screening on the downlink measurement pilot ports according to the magnitude of power or signal-to-noise ratios of the received signals.

In an exemplary embodiment, the calculating module is arranged to set an uplink precoding weight vector, calculated and obtained by combining the receiving weight vector with uplink and downlink operating frequencies, for data precoding, or set N uplink precoding weight vectors, calculated and obtained by combining the receiving weight vector with uplink and downlink operating frequencies, for uplink pilot precoding in the following manner:

obtaining an uplink transmitting weight vector of the downlink measurement pilot port according to the receiving weight vector of the corresponding downlink measurement pilot port, and multiplying a ratio of an uplink operating frequency to a downlink operating frequency with a phase of the uplink transmitting weight vector.

In an exemplary embodiment, the calculating module is arranged to set N uplink precoding weight vectors, calculated and obtained by combining the receiving weight vector with uplink and downlink operating frequencies, for uplink pilot precoding in the following manner:

after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and the number of the downlink measurement pilot ports;

or, after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and at least one of the following factors;

the factors include: (a) a precoding weight or a beam width of a downlink beam pilot; (b) the number of downlink transmitting antennas; (c) the number of uplink transmitting antennas; and (d) signal-to-noise ratios of the received signals.

In order to solve the above-described technical problem, an embodiment of the present document further provides a computer storage medium storing computer executable instructions, and the computer executable instructions being used for performing the above-mentioned method.

Compared with the related art, the embodiments of the present document provide a method and system for processing a downlink pilot signal, herein, by using the beam precoding pilot technique in combination with the multipath resolution technique, each path is respectively back-calculated with respect to reciprocity and then combined, such that reciprocity in the FDD system can also be efficiently utilized and pilot overhead in the communication system can be effectively reduced.

DETAILED EMBODIMENTS

Embodiments of the present document will be described below in detail in combination with the drawings. It needs to be stated that the embodiments and the features of the embodiments in the present application can be freely combined without conflicting.

Figure 1:
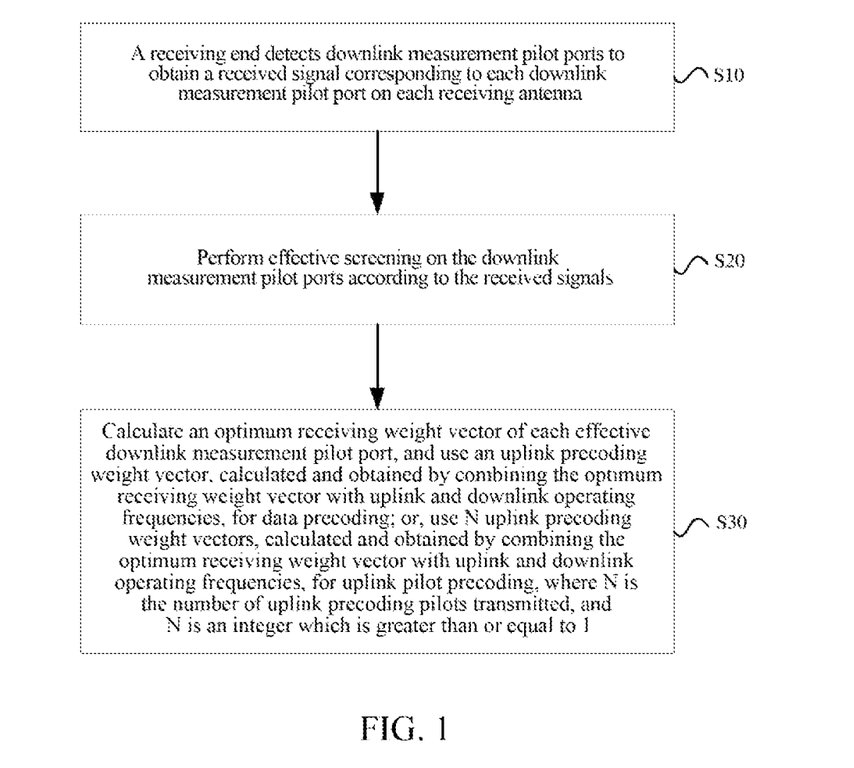
FIG. 1 is a flowchart of a method for processing a downlink pilot signal in an embodiment of the present document.

As shown in FIG. 1, an embodiment of the present document provides a method for processing a downlink pilot signal, and the method includes the following steps.

In S10, a receiving end detects downlink measurement pilot ports to obtain a received signal corresponding to each downlink measurement pilot port on each receiving antenna;

In S20, effective screening is performed on the downlink measurement pilot ports according to the received signals;

In S30, an optimum receiving weight vector of each effective downlink measurement pilot port is calculated, and an uplink precoding weight vector, calculated and obtained by combining the optimum receiving weight vector with uplink and downlink operating frequencies, is used for data precoding; or, N uplink precoding weight vectors, calculated and obtained by combining the optimum receiving weight vector with uplink and downlink operating frequencies, are used for uplink pilot precoding, where N is the number of uplink precoding pilots transmitted, and N is an integer which is greater than or equal to 1.

In an exemplary embodiment, each downlink measurement pilot port is formed by the same set of antennas of a transmitting end using different precoding weights for transmission.

In an exemplary embodiment, the weight vector is a DFT (Discrete Fourier Transform) vector.

In an exemplary embodiment, performing effective screening on the downlink measurement pilot ports according to the received signals includes performing effective screening on the downlink measurement pilot ports according to the magnitude of power or signal-to-noise ratios of the received signals.

In an exemplary embodiment, using an uplink precoding weight vector, calculated and obtained by combining the optimum receiving weight vector with uplink and downlink operating frequencies, for data precoding, or using N uplink precoding weight vectors, calculated and obtained by combining the optimum receiving weight vector with uplink and downlink operating frequencies, for uplink pilot precoding includes:

obtaining an optimum uplink transmitting weight vector of the effective downlink measurement pilot port according to the optimum receiving weight vector of the corresponding effective downlink measurement pilot port, and multiplying a ratio of an uplink operating frequency to a downlink operating frequency with a phase of the optimum uplink transmitting weight vector.

In an exemplary embodiment, using an uplink precoding weight vector, calculated and obtained by combining the optimum receiving weight vector with uplink and downlink operating frequencies, for data precoding, or when N=1, using one uplink precoding weight vector, calculated and obtained by combining the optimum receiving weight vector with uplink and downlink operating frequencies, for uplink pilot precoding includes:

obtaining an optimum uplink transmitting weight vector of each effective downlink measurement pilot port according to the uplink and downlink frequencies and the optimum receiving weight vector of the corresponding effective downlink measurement pilot port;

using the one uplink precoding weight vector, obtained by weighting and combining optimum uplink transmitting weight vectors of various effective downlink measurement pilot ports, for data precoding or uplink pilot precoding.

In an exemplary embodiment, using N uplink precoding weight vectors, calculated and obtained by combining the optimum receiving weight vector with uplink and downlink operating frequencies, for uplink pilot precoding includes:

after calculated and obtaining the uplink precoding weight vector by combining the optimum receiving weight vector with the uplink and downlink operating frequencies, further determining the number of uplink measurement pilots and/or an uplink measurement pilot precoding weight according to the uplink precoding weight vector and the number of the effective downlink measurement pilot ports;

or, after calculated and obtaining the uplink precoding weight vector by combining the optimum receiving weight vector with the uplink and downlink operating frequencies, further determining the number of uplink measurement pilots and/or an uplink measurement pilot precoding weight according to the uplink precoding weight vector and at least one of the following factors; the factors include: (a) a precoding weight or a beam width of a downlink beam pilot; (b) the number of downlink transmitting antennas; (c) the number of uplink transmitting antennas; and (d) signal-to-noise ratios of the received signals.

Figure 2:
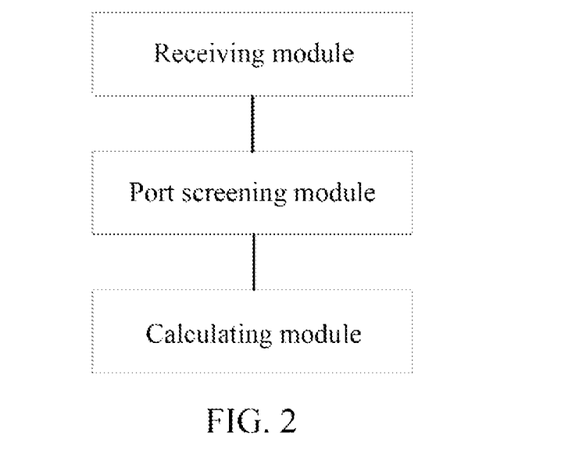
FIG. 2 is a schematic diagram of a system for processing a downlink pilot signal in an embodiment of the present document.

As shown in FIG. 2, an embodiment of the present document provides a system for processing a downlink pilot signal that is applied to a receiving end, and the system includes:

a receiving module, arranged to detect downlink measurement pilot ports to obtain a received signal corresponding to each downlink measurement pilot port on each receiving antenna;

a port screening module, arranged to perform effective screening on the downlink measurement pilot ports according to the received signals;

a calculating module, arranged to calculate an optimum receiving weight vector of each effective downlink measurement pilot port, and set an uplink precoding weight vector, calculated and obtained by combining the optimum receiving weight vector with uplink and downlink operating frequencies, for data precoding; or, set N uplink precoding weight vectors, calculated and obtained by combining the optimum receiving weight vector with uplink and downlink operating frequencies, for uplink pilot precoding, where N is the number of uplink precoding pilots transmitted, and N is an integer which is greater than or equal to 1.

In an exemplary embodiment, the calculating module is arranged to set an uplink precoding weight vector, calculated and obtained by combining the optimum receiving weight vector with uplink and downlink operating frequencies, for data precoding, or when N=1, set one uplink precoding weight vector, calculated and obtained by combining the optimum receiving weight vector with uplink and downlink operating frequencies, for uplink pilot precoding in the following manner:

obtaining an optimum uplink transmitting weight vector of each effective downlink measurement pilot port according to the uplink and downlink frequencies and the optimum receiving weight vector of the corresponding effective downlink measurement pilot port;

setting the one uplink precoding weight vector, obtained by weighting and combining the optimum uplink transmitting weight vectors of various effective downlink measurement pilot ports, for data precoding or uplink pilot precoding.

In an exemplary embodiment, each downlink measurement pilot port is formed by the same set of antennas of a transmitting end using different precoding weights for transmission.

In an exemplary embodiment, the port screening module is arranged to perform effective screening on the downlink measurement pilot ports according to the received signals in the following manner:

effective screening is performed on the downlink measurement pilot ports according to the magnitude of power or signal-to-noise ratios of the received signals.

In an exemplary embodiment, the calculating module is arranged to set an uplink precoding weight vector, calculated and obtained by combining the optimum receiving weight vector with uplink and downlink operating frequencies, for data precoding, or set N uplink precoding weight vectors, calculated and obtained by combining the optimum receiving weight vector with uplink and downlink operating frequencies, for uplink pilot precoding in the following manner:

obtaining an optimum uplink transmitting weight vector of the effective downlink measurement pilot port according to the optimum receiving weight vector of the corresponding effective downlink measurement pilot port, and multiplying a ratio of an uplink operating frequency to a downlink operating frequency with a phase of the optimum uplink transmitting weight vector.

In an exemplary embodiment, the calculating module is arranged to set N uplink precoding weight vectors, calculated and obtained by combining the optimum receiving weight vector with uplink and downlink operating frequencies, for uplink pilot precoding in the following manner:

after calculated and obtaining the uplink precoding weight vector by combining the optimum receiving weight vector with the uplink and downlink operating frequencies, the number of uplink measurement pilots and/or an uplink measurement pilot precoding weight is further determined according to the uplink precoding weight vector and the number of the effective downlink measurement pilot ports;

or, after calculated and obtaining the uplink precoding weight vector by combining the optimum receiving weight vector with the uplink and downlink operating frequencies, the number of uplink measurement pilots and/or an uplink measurement pilot precoding weight is further determined according to the uplink precoding weight vector and at least one of the following factors; the factors include: (a) a precoding weight or a beam width of a downlink beam pilot; (b) the number of downlink transmitting antennas; (c) the number of uplink transmitting antennas; and (d) signal-to-noise ratios of the received signals.

The embodiment of the present document utilizes reciprocity in the FDD system. Generally, the uplink and downlink channels in the FDD system do not have good reciprocity, and the main reason for that is that: operating frequencies of the uplink and downlink are different. Different operating frequencies may cause different phase differences among antennas, and there is also a difference in path loss. Due to the existence of channel multipath, for some related techniques such as measurement based on non-precoded CSI-RS pilots, there is no way to back-calculate channel responses at other frequencies to further perform reciprocity after obtaining a downlink channel matrix H. However, in the embodiments of the present document, by using a beam precoding pilot technique in combination with a multipath resolution technique, each path is respectively back-calculated with respect to reciprocity and then combined, such that reciprocity in the FDD system may also be utilized better, and thereby the transmission amount of uplink pilots is reduced.

How to process a downlink pilot signal in the embodiments of the present document is further described below.

A transmitting end transmits downlink beam pilots, herein each downlink beam pilot corresponds to a virtual antenna port which is generally referred to as an antenna port. The downlink beam pilots herein are formed through transmission of the same source information on an identical resource by a plurality of antenna units, signals transmitted on these antenna units correspond to a weight, respectively. Shape, width and direction of the beam may be adjusted through adjustment of the weight.

For a linear antenna array, the transmitting end may use a DFT vector as a beam weight. The DFT vector of the i-th beam is represented as:

$$v_i = [\,1 \quad e^{j\phi_i} \quad \ldots \quad e^{j(n-1)\phi_i}\,]^H,$$

where n is related to the dimension (i.e., the number of units), and $\phi_i$ is a phase of a control direction. If the problem of pilot overhead is taken into account, the number of total beams is limited and the beam weight may also be some superposition of a plurality of DFT vectors. For some other antenna topologies, such as an antenna array of X row and Y column, some functional forms based on the DFT vector may be employed to construct a beam weight. For example, the beam weight is $f(v_i, v_j) = v_i \otimes v_j$ or the beam weight is $$f(v_i, v_j) = \begin{bmatrix} v_i \\ v_j \end{bmatrix},$$

etc.

After determining the beam weight, the beam width is thus determined. Generally, for Massive MIMO, since the number of antennas is large, the beam may be compressed to be very narrow, for example, for beams of 64 antennas with a good weight design, the beam width is only about 6 degrees, and for 128 antennas, the beam width may be about 3 degrees.

A receiving end would detect a receiving power on a port that corresponds to each beam pilot. Since the ports are separated from each other on time-frequency resources, they do not interfere with each other. The receiving end may, according to the receiving power situation thereof on a receiving antenna in combination with direction information of the beam, see a general multipath distribution situation, however, due to the fact that perfect beam width and noise and the like are not possible, general multipath distribution information is merely mentioned here. The receiving end will more accurately detect receiving power information on each port on the receiving antenna and estimate a corresponding channel amplitude response, and since a transmission power is known, amplitude response information of each path may be more accurately calculated according to the receiving power. The receiving end may also detect phase information on each receiving antenna that corresponds to each port, and since transmission signals in transmission pilots are known, phase difference information between each port and each receiving antenna may be obtained. In fact, the phase difference information is the phase response of the channel. Conjugation of phase responses of a plurality of receiving antennas corresponding to an identical transmitting port is phase information of an optimum receiving weight corresponding to the port.

Therefore, once a certain beam has higher energy, it is indicated that there are multipath components in this direction, and based on the amount of the multipath components and angular relationships between the multipath, the number and weight (beam direction) of the uplink beam pilot may be determined.

Figure 3:
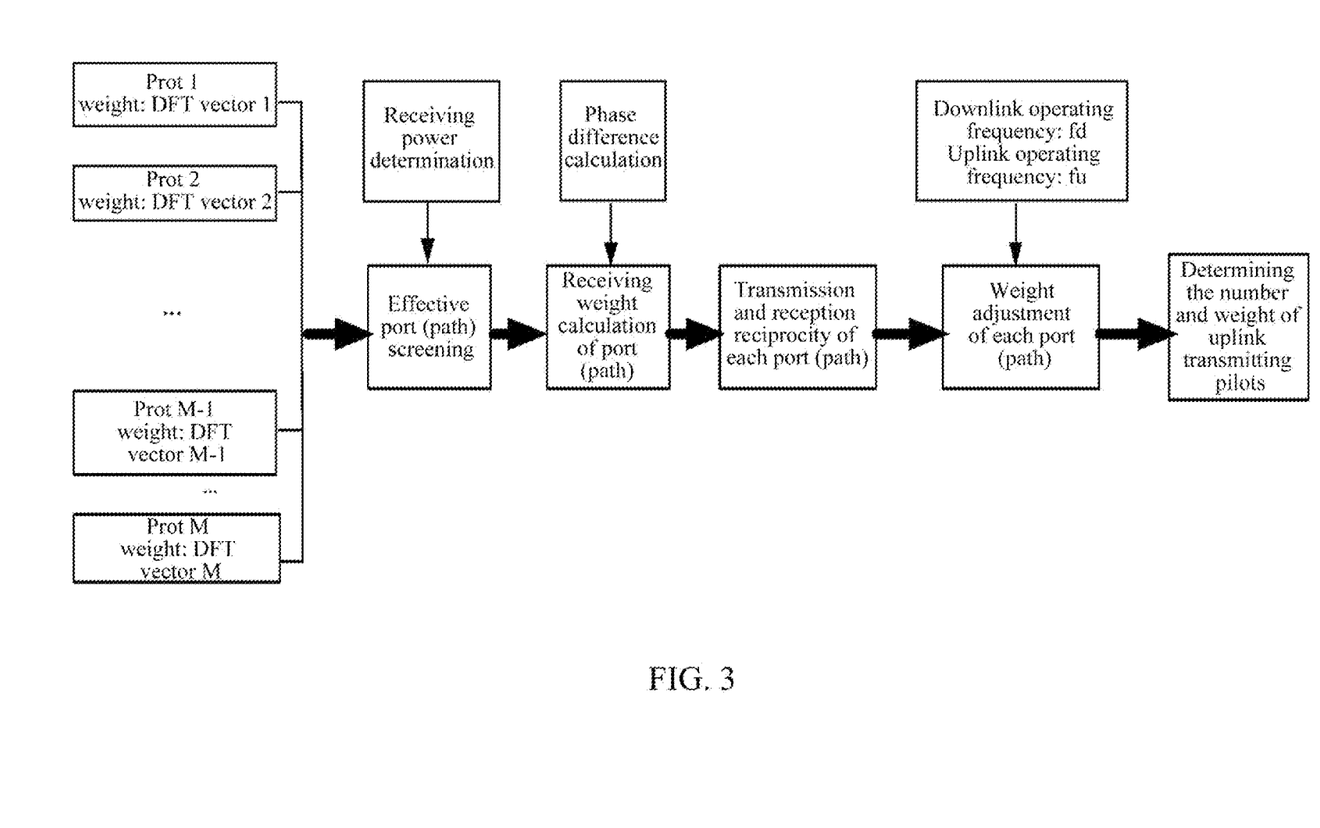
FIG. 3 is a schematic diagram of information interaction of a method for processing a downlink pilot signal in an embodiment of the present document.

FIG. 3 is a schematic view of information interaction of a method for processing a downlink pilot signal in the embodiment of the present document. As shown in FIG. 3, beam pilots are first transmitted by the transmitting end, and the receiving end performs screening on paths according to the receiving power of each port, an optimum receiving weight calculation with respect to each path and port is performed on the screened effective paths and ports, herein the calculation is determined according to a phase difference between the receiving antennas on each port. Channel reciprocity may be performed after determining the phase difference so as to obtain an uplink transmitting optimum weight on each port. After obtaining the weight, recalculation may be performed on the uplink optimum weight of each port (due to different downlink operating frequency fd and uplink operating frequency fu), and then the number and weight of uplink transmitting pilots are determined.

During a specific application, supposing that there are 64 antennas at the transmitting end and 16 antennas at the receiving end, the transmitting end transmits 128 beams, and may use Sector beam and Finer beam techniques that are mentioned in background of the related art to reduce pilot overhead. For example:

No matter whether transmission is performed through a secondary beam or a primary beam, the receiving end may always finally detect a plurality of beam pilot ports, for example, one of the following: a user terminal UE detects that a receiving power of beam 0 is a0 dBm, the UE detects that a receiving power of beam 1 is a1 dBm, . . . , the UE detects that a receiving power of beam 127 is a127 dBm; the UE employs threshold screening, for example, the threshold is b, and the UE compares a0, a1, a 127 with b, if the result is greater than threshold b, it is considered to be an effective path, otherwise, it is considered to be an ineffective path. Another method is a relative threshold method, for example, an UE determines a power of the strongest path, and if a power difference from the strongest path is less than X dB, it is considered to be an effective path, for example, X may be 20. The two methods described above may also be used in combination. In addition to the above-described power determination method, a signal-to-noise ratio determination method may also be employed to perform selection on effective paths.

For example, effective beams are i, j and k, the UE will calculate an optimum receiving beam weight with respect to each beam. Then, supposing that corresponding beam weight vectors are $u_i$, $u_j$ and $u_k$, the weight should be an optimum precoding weight of uplink transmissions under a condition that the uplink frequency is equal to the downlink frequency. However, since the uplink and downlink operating frequencies are different, the weight needs to be adjusted in a targeted way. The adjustment is based on the fact that the phase difference between two elements in each weight vector is adjusted to the product of the original phase difference and a ratio of the uplink operating frequency (fu) to the downlink operating frequency (fd). For example, the original phase response is j, and the corresponding phase is $\pi/2$, and if the ratio of the uplink operating frequency to the downlink operating frequency is fu/fd=1760/1865=0.943, the phase difference is adjusted to $0.943*\pi/2$, which is equivalent to that $u_i$, $u_j$ and $u_k$ may be adjusted to $\bar{u}_i$, $\bar{u}_j$ and $\bar{u}_k$, and phases in $\bar{u}_i$, $\bar{u}_j$ and $17_k$ are conjugated to obtain $\bar{u}_i^H$, $\bar{u}_j^H$ and $\bar{u}_k^H$.

At this point, there are several processing methods for determining the precoding weight and number of beams of uplink power transmission.

Method 1:

Uplink precoding beam pilot information may be obtained by adding $\bar{u}_i^H$, $\bar{u}_j^H$ and $\bar{u}_k^H$. At this time, a precoding vector may be generated and such precoding vector is most likely not the DFT vector since superposition exists here. In superposition, an amplitude weight thereof $u=a_i\bar{u}_i^H+a_j\bar{u}_j^H+a_k\bar{u}_k^H$ may determined according to the power of each effective path, where $a_i$, $a_j$ and $a_k$ are amplitude weights determined according to the power.

TABLE 1

|  | Finer beam 0 | Finer beam 1 | Finer beam 2 | Finer beam 3 | Finer beam 4 | Finer beam 5 | Finer beam 6 | Finer beam 7 |
| --- | --- | --- | --- | --- | --- | --- | --- | --- |
| Sector beam 0 beam 0 + 1 . . . + 7 | beam 0 | beam 1 | beam 2 | beam 3 | beam 4 | beam 5 | beam 6 | beam 7 |
| Sector beam 1 beam 8 + 9 . . . + 15 | beam 8 | beam 9 | beam 10 | beam 11 | beam 12 | beam 13 | beam 14 | beam 15 |
| . . . | . . . | . . . | . . . | . . . | . . . | . . . | . . . | . . . |
| Sector beam 14 beam 112 + 113 . . . + 119 | beam 112 | beam 113 | beam 114 | beam 115 | beam 116 | beam 117 | beam 118 | beam 119 |
| Sector beam 15 beam 120 + 121 . . . + 127 | beam 120 | beam 121 | beam 122 | beam 123 | beam 124 | beam 125 | beam 126 | beam 127 |

At this time, the terminal may determine the estimated uplink optimum precoding weight thereof, determine an error range according to various factors such as a situation of combined powers of other paths in addition to the effective multipath, a situation of signal-to-noise ratios of effective paths, and the like, and then transmit a plurality of beams around the calculated u, herein the specific numerical value is determined by factors that cause an error. The factors that cause sources of error may be as follows:

(a) Receiving Power of Downlink Measurement Pilot

If receiving powers of some ports are too small, an error may be introduced due to the influence of noise, and therefore the calculated u is inaccurate, and some vectors that deviate by a certain distance from vector u need to be selected as the precoding weights. In an exemplary embodiment, the number and precoding weight of the vector may be determined according to a ratio of the receiving power to a noise power.

For example, the number of uplink transmitting beam pilots is determined according to the receiving power of the downlink measurement pilot. Supposing that a calculated characteristic vector is o, o and some beams, which point in vector directions, around the vector o are transmitted according to possible error situations.

(b) The Number of Downlink Transmitting Antennas or Beam Width of Downlink Measurement Pilots The smaller the number of downlink transmitting antennas, the wider the beam pilots of downlink measurement pilots. Too wide beam width of the downlink measurement pilots will cause a low resolution, and is also the source of error. Therefore, the wider the downlink beam width, the more the uplink pilots needed to be transmitted.

(c) The Number of Uplink Transmitting Antennas

The smaller the number of uplink transmitting antennas, the wider the uplink beam pilots and the higher the tolerance to error. At this point, the number of uplink pilots transmitted may be smaller.

If the receiving end considers that there is no error, the vector may be directly used to perform normalization processing, and precoding is performed on data transmission such that transmission of the uplink pilots is unnecessary.

Method 2:

For example, there are the following 32 candidate beams for 16 uplink antennas. Since $\bar{u}_i^H$, $\bar{u}_j^H$ and $\bar{u}_k^H$ are approximate DFT vectors, the UE may know which beam the $\bar{u}_i^H$, $\bar{u}_j^H$ and $\bar{u}_k^H$ respectively belong to according to $\bar{u}_i^H$, $\bar{u}_j^H$ and $\bar{u}_k^H$, and may therefore determine $\bar{u}_i^H$, $\bar{u}_j^H$ and $\bar{u}_k^H$ are closest to which beam, or have the highest projection energy. Since the number of uplink antennas is smaller than the number of downlink antennas, the uplink beams are relatively wide. $\bar{u}_i^H$, $\bar{u}_j^H$ and $\bar{u}_k^H$ may correspond to 1 to 3 uplink beams, respectively. The terminal selects a corresponding uplink beam for transmission, including determination of the number and determination of the weight.

That is to say, the number of uplink candidate beams to which the uplink precoding weight vector u belongs or corresponds is used as the number of determined uplink beam pilots, and the weight of uplink candidate beams to which the uplink precoding weight vector u belongs or corresponds is used as the precoding weight of the determined uplink beam pilots.

Method 3:

For example, there are the following 32 candidate beams for 16 uplink antennas. Since $\bar{u}_i^H$, $\bar{u}_j^H$ and $\bar{u}_k^H$ are approximate DFT vectors, the UE may know which beam the $\bar{u}_i^H$, $\bar{u}_j^H$ and $\bar{u}_k^H$ respectively belong to according to $\bar{u}_i^H \bar{u}_j^H$ and $\bar{u}_k^H$, and may therefore determine $\bar{u}_i^H$, $\bar{u}_j^H$ and $\bar{u}_k^H$ are closest to which beam, or have the highest projection energy. Since the number of uplink antennas is smaller than the number of downlink antennas, the uplink beams are relatively wide. $\bar{u}_i^H$, $\bar{u}_j^H$ and $\bar{u}_k^H$ may correspond to 1 to 3 uplink beams, respectively. The terminal may, according to the situation of error, select a corresponding beam and 2 closest beams around the corresponding beam as the precoding weight for uplink beam transmission.

That is to say, the number of uplink candidate beams, to which the uplink precoding weight vector u belongs or corresponds, plus n, is used as the number of determined uplink beam pilots, and the weight of uplink candidate beams to which the uplink precoding weight vector u belongs or corresponds and the weight of n closest beams around the uplink candidate beams are used as the precoding weight of the uplink beam pilots, where n is an integer that is smaller than or equal to 2.

Or, a beam grouping situation may be agreed in advance for a base station and the terminal, herein the beams are divided into the structures of Sector beam and finer beam, as shown in Table 2, beams included in Sector beam may be overlapped.

TABLE 2

| | Finer beam 0 | Finer beam 1 | Finer beam 2 | Finer beam 3 |
|---|---|---|---|---|
| Sector beam 0 beam 0 + 1 . . . + 3 | beam 0 | beam 1 | beam 2 | beam 3 |
| Sector beam 1 beam 2 + 3 . . . + 5 | beam 2 | beam 3 | beam 4 | beam 5 |
| Sector beam 2 beam 4 + 5 . . . + 7 | beam 4 | beam 5 | beam 6 | beam 7 |
| Sector beam 3 beam 6 + 7 . . . + 9 | beam 6 | beam 7 | beam 8 | beam 9 |
| . . . | . . . | . . . | . . . | . . . |
| Sector beam 14 beam 26 + 27 . . . + 29 | beam 26 | beam 27 | beam 28 | beam 29 |
| Sector beam 15 beam 28 + 29 . . . + 31 | beam 28 | beam 29 | beam 30 | beam 31 |

The terminal may determine into which Sector beam $\bar{u}_i^H$, $\bar{u}_j^H$ and $\bar{u}_k^H$ respectively fall, and then transmit beam pilots corresponding to finer beam included in Sector beam, and the terminal notifies the base station of information of the sector beam.

That is to say, the number of narrow beams included in uplink candidate coarse beams (one or more) to which the uplink precoding weight vector u belongs or corresponds is used as the number of determined uplink beam pilots, and the weight of the fine beams is used as the precoding weight of uplink beam pilots.

The above-described embodiment provides a method and system for processing a downlink pilot signal, herein, by using the beam precoding pilot technique in combination with the multipath resolution technique, each path is respectively back-calculated with respect to reciprocity and is then combined such that reciprocity in FDD system can also be efficiently utilized and pilot overhead in communication system can be effectively reduced.

One ordinary skilled in the art can understand that all or partial steps in the above-described method can be completed by relevant hardware instructed by a program, and the program can be stored in a computer-readable storage medium, such as a read-only memory, a magnetic disc or a compact disc, and the like. In an exemplary embodiment, all or partial steps in the above-described embodiments can also be implemented by using one or more integrated circuits. Correspondingly, all modules/units in the above-described embodiments can be implemented in the form of hardware, and can also be implemented in the form of software function modules. The present document shall not be limited to a combination of hardware and software in any specific form.

It needs to be noted that the present document can also have a plurality of other embodiments, and one skilled in the art may make various corresponding changes and variations according to the present document without departing from the spirit and essence of the present document. However, these corresponding changes and variations shall be considered to be within the protection scope of appended claims of the present document.

INDUSTRIAL APPLICABILITY

The above technical solutions enable reciprocity in the FDD system to be efficiently utilized and pilot overhead in the communication system can be effectively reduced.

What we claim is:

1. A method for processing a downlink pilot signal, the method comprising:
   detecting, by a receiving end, downlink measurement pilot ports to obtain a received signal corresponding to each downlink measurement pilot port on each receiving antenna;
   performing screening on the downlink measurement pilot ports according to the received signals;
   calculating a receiving weight vector of each downlink measurement pilot port, and using an uplink precoding weight vector, calculated and obtained by combining the receiving weight vector with uplink and downlink operating frequencies, for data precoding; or, using N uplink precoding weight vectors, calculated and obtained by combining the receiving weight vector with uplink and downlink operating frequencies, for uplink pilot precoding, where N is the number of uplink precoding pilots transmitted, and N is an integer which is greater than or equal to 1.

2. The method of claim 1, wherein:
   using an uplink precoding weight vector, calculated and obtained by combining the receiving weight vector with uplink and downlink operating frequencies, for data precoding, or when N=1, using one uplink precoding weight vector, calculated and obtained by combining the receiving weight vector with uplink and downlink operating frequencies, for uplink pilot precoding comprises:
   obtaining an uplink transmitting weight vector of each downlink measurement pilot port according to the uplink and downlink frequencies and the receiving weight vector of the corresponding downlink measurement pilot port;
   using the one uplink precoding weight vector, obtained by weighting and combining uplink transmitting weight vectors of various downlink measurement pilot ports, for data precoding or uplink pilot precoding.

3. The method of claim 1, wherein:
   each downlink measurement pilot port is formed by the same set of antennas of a transmitting end using different precoding weights for transmission.

4. The method of claim 1, wherein:
   performing screening on the downlink measurement pilot ports according to the received signals comprises:
   performing screening on the downlink measurement pilot ports according to the magnitude of power or signal-to-noise ratios of the received signals.

5. The method of claim 1, wherein:
   using an uplink precoding weight vector, calculated and obtained by combining the receiving weight vector with uplink and downlink operating frequencies, for data precoding, or using N uplink precoding weight vectors, calculated and obtained by combining the receiving weight vector with uplink and downlink operating frequencies, for uplink pilot precoding comprises:
   obtaining an uplink transmitting weight vector of the downlink measurement pilot port according to the receiving weight vector of the corresponding downlink measurement pilot port, and multiplying a ratio of an uplink operating frequency to a downlink operating frequency with a phase of the uplink transmitting weight vector.

6. The method of claim 1, wherein:
   using N uplink precoding weight vectors, calculated and obtained by combining the receiving weight vector with uplink and downlink operating frequencies, for uplink pilot precoding comprises:
   after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and the number of the downlink measurement pilot ports;
   or,
   after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and at least one of the following factors;
   the factors comprise: (a) a precoding weight or a beam width of a downlink beam pilot; (b) the number of downlink transmitting antennas; (c) the number of uplink transmitting antennas; and (d) signal-to-noise ratios of the received signals.

7. A system for processing a downlink pilot signal applied to a receiving end, the system comprising:
   a receiving module, arranged to detect downlink measurement pilot ports to obtain a received signal corresponding to each downlink measurement pilot port on each receiving antenna;
   a port screening module, arranged to perform screening on the downlink measurement pilot ports according to the received signals;
   a calculating module, arranged to calculate a receiving weight vector of each downlink measurement pilot port, and set an uplink precoding weight vector, calculated and obtained by combining the receiving weight vector with uplink and downlink operating frequencies, for data precoding; or, set N uplink precoding weight vectors, calculated and obtained by combining the receiving weight vector with uplink and downlink operating frequencies, for uplink pilot precoding, where N is the number of uplink precoding pilots transmitted, and N is an integer which is greater than or equal to 1.

8. The system of claim 7, wherein:
   the calculating module is arranged to set an uplink precoding weight vector, calculated and obtained by combining the receiving weight vector with uplink and downlink operating frequencies, for data precoding, or when N=1, set one uplink precoding weight vector, calculated and obtained by combining the receiving weight vector with uplink and downlink operating frequencies, for uplink pilot precoding in the following manner:

obtaining an uplink transmitting weight vector of each downlink measurement pilot port according to the uplink and downlink frequencies and the receiving weight vector of the corresponding downlink measurement pilot port;

setting the one uplink precoding weight vector, obtained by weighting and combining uplink transmitting weight vectors of various downlink measurement pilot ports, for data precoding or uplink pilot precoding.

9. The system of claim 7, wherein:
each downlink measurement pilot port is formed by the same set of antennas of a transmitting end using different precoding weights for transmission.

10. The system of claim 7, wherein:
the port screening module is arranged to perform screening on the downlink measurement pilot ports according to the received signals in the following manner:
performing screening on the downlink measurement pilot ports according to the magnitude of power or signal-to-noise ratios of the received signals.

11. The system of claim 7, wherein:
the calculating module is arranged to set an uplink precoding weight vector, calculated and obtained by combining the receiving weight vector with uplink and downlink operating frequencies, for data precoding, or set N uplink precoding weight vectors, calculated and obtained by combining the receiving weight vector with uplink and downlink operating frequencies, for uplink pilot precoding in the following manner:
obtaining an uplink transmitting weight vector of the downlink measurement pilot port according to the receiving weight vector of the corresponding downlink measurement pilot port, and multiplying a ratio of an uplink operating frequency to a downlink operating frequency with a phase of the uplink transmitting weight vector.

12. The system of claim 7, wherein:
the calculating module is arranged to set N uplink precoding weight vectors, calculated and obtained by combining the receiving weight vector with uplink and downlink operating frequencies, for uplink pilot precoding in the following manner:
after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and the number of the downlink measurement pilot ports;
or,
after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and at least one of the following factors;
the factors comprise: (a) a precoding weight or a beam width of a downlink beam pilot; (b) the number of downlink transmitting antennas; (c) the number of uplink transmitting antennas; and (d) signal-to-noise ratios of the received signals.

13. A non-transitory computer-readable storage medium encoded with computer-executable instructions that, when executed, cause a processing system to perform the steps of:
detecting downlink measurement pilot ports to obtain a received signal corresponding to each downlink measurement pilot port on each receiving antenna;
performing screening on the downlink measurement pilot ports according to the received signals;
calculating a receiving weight vector of each downlink measurement pilot port, and using an uplink precoding weight vector, calculated and obtained by combining the receiving weight vector with uplink and downlink operating frequencies, for data precoding; or, using N uplink precoding weight vectors, calculated and obtained by combining the receiving weight vector with uplink and downlink operating frequencies, for uplink pilot precoding, where N is the number of uplink precoding pilots transmitted, and N is an integer which is greater than or equal to 1.

14. The non-transitory computer-readable storage medium of claim 13, further comprising instructions that, when executed, cause the processing system to perform the steps of:
obtaining an uplink transmitting weight vector of each downlink measurement pilot port according to the uplink and downlink frequencies and the receiving weight vector of the corresponding downlink measurement pilot port;
using the one uplink precoding weight vector, obtained by weighting and combining uplink transmitting weight vectors of various downlink measurement pilot ports, for data precoding or uplink pilot precoding.

15. The non-transitory computer-readable storage medium of claim 13, wherein each downlink measurement pilot port is formed by the same set of antennas of a transmitting end using different precoding weights for transmission.

16. The non-transitory computer-readable storage medium of claim 13, further comprising instructions that, when executed, cause the processing system to perform the steps of:
performing screening on the downlink measurement pilot ports according to the magnitude of power or signal-to-noise ratios of the received signals.

17. The non-transitory computer-readable storage medium of claim 13, further comprising instructions that, when executed, cause the processing system to perform the steps of:
obtaining an uplink transmitting weight vector of the downlink measurement pilot port according to the receiving weight vector of the corresponding downlink measurement pilot port, and multiplying a ratio of an uplink operating frequency to a downlink operating frequency with a phase of the uplink transmitting weight vector.

18. The non-transitory computer-readable storage medium of claim 13, further comprising instructions that, when executed, cause the processing system to perform the steps of:
after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and the number of the downlink measurement pilot ports;

or, after calculating and obtaining the uplink precoding weight vector by combining the receiving weight vector with the uplink and downlink operating frequencies, further determining the number of uplink measurement pilots and/or an uplink measurement pilot precoding weight according to the uplink precoding weight vector and at least one of the following factors;

wherein the factors comprise: (a) a precoding weight or a beam width of a downlink beam pilot; (b) the number of downlink transmitting antennas; (c) the number of uplink transmitting antennas; and (d) signal-to-noise ratios of the received signals.

* * * * *